(12) United States Patent
Peisa et al.

(10) Patent No.: US 9,386,596 B2
(45) Date of Patent: Jul. 5, 2016

(54) ENHANCED PACKET SERVICE FOR TELECOMMUNICATIONS

(75) Inventors: Janne Peisa, Espoo (FI); Håkan Olofsson, Stockholm (SE); Mats Fredrik Sågfors, Kyrkslätt (FI); Per Synnergren, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 2631 days.

(21) Appl. No.: 11/617,792

(22) Filed: Dec. 29, 2006

(65) Prior Publication Data

US 2008/0002617 A1    Jan. 3, 2008

Related U.S. Application Data

(60) Provisional application No. 60/806,437, filed on Jun. 30, 2006.

(51) Int. Cl.
| | |
|---|---|
| *H04W 72/12* | (2009.01) |
| *H04W 52/28* | (2009.01) |
| *H04W 88/08* | (2009.01) |

(52) U.S. Cl.
CPC ........ *H04W 72/1231* (2013.01); *H04W 52/286* (2013.01); *H04W 88/08* (2013.01)

(58) Field of Classification Search
CPC .......... H04W 72/1231; H04W 52/286; H04W 88/08; H04L 12/5602; H04L 47/32; H04L 1/1812; H04L 1/1887; H04L 1/1877; H04L 63/102; H04L 63/1441; H04L 63/168; H04L 69/22

USPC ........ 370/338, 329, 230, 235, 389, 469, 516; 709/224, 229

See application file for complete search history.

(56) References Cited

U.S. PATENT DOCUMENTS

| | | | |
|---|---|---|---|
| 5,629,936 A | 5/1997 | Lee et al. | |
| 6,064,890 A * | 5/2000 | Hirose et al. | 455/513 |
| 6,336,140 B1 * | 1/2002 | Elgressy et al. | 709/224 |
| 6,665,317 B1 * | 12/2003 | Scott | 370/516 |
| 7,346,077 B2 * | 3/2008 | Tourunen et al. | 370/469 |
| 7,564,788 B2 | 7/2009 | Lundh et al. | |

(Continued)

FOREIGN PATENT DOCUMENTS

| | | |
|---|---|---|
| EP | 0 715 479 A1 | 6/1996 |
| EP | 0 847 146 A2 | 6/1998 |

(Continued)

OTHER PUBLICATIONS

International Search Report and Written Opinion mailed Jul. 25, 2007 in PCT application PCT/SE2006/050633.

(Continued)

*Primary Examiner* — Nizar Sivji

(57) ABSTRACT

A packet service enhancement mode (60) and packet service enhancer (35) is provided for operating a packet channel (25) existing over an air interface (27) between a base station node and a user equipment unit of a telecommunications network. As one aspect of the technology, a packet service enhancement method comprises performing a monitoring of a radio link connection carried by the packet channel and, in accordance with the monitoring, both modifying an operational parameter for the packet channel and dropping non-consecutive packets from the packet channel.

25 Claims, 8 Drawing Sheets

(56) References Cited

U.S. PATENT DOCUMENTS

| | | | |
|---|---|---|---|
| 7,710,922 | B2 | 5/2010 | Lundh et al. |
| 2002/0075834 | A1 | 6/2002 | Shah et al. |
| 2003/0012200 | A1 | 1/2003 | Salamat |
| 2003/0210660 | A1 | 11/2003 | Wiberg et al. |
| 2005/0043051 | A1 | 2/2005 | Takano et al. |
| 2005/0074002 | A1* | 4/2005 | Yoakum et al. ............... 370/389 |
| 2005/0201499 | A1 | 9/2005 | Jonsson |
| 2005/0245266 | A1 | 11/2005 | Viero et al. |
| 2006/0007914 | A1 | 1/2006 | Chandra et al. |
| 2006/0072510 | A1 | 4/2006 | Aizawa |
| 2006/0146749 | A1 | 7/2006 | Lundh et al. |
| 2006/0203823 | A1 | 9/2006 | Jiang |
| 2006/0252452 | A1* | 11/2006 | Umesh et al. .............. 455/550.1 |
| 2007/0127522 | A1 | 6/2007 | Lundh et al. |
| 2007/0183323 | A1* | 8/2007 | Hannu et al. .................. 370/230 |
| 2008/0159184 | A1 | 7/2008 | Niwano |

FOREIGN PATENT DOCUMENTS

| | | | |
|---|---|---|---|
| EP | 1 401 230 | A1 | 3/2004 |
| EP | 1 615 347 | A2 | 1/2006 |
| EP | 1 708 383 | A1 | 10/2006 |
| WO | 93/12623 | A1 | 6/1993 |
| WO | 00/65852 | A1 | 11/2000 |
| WO | WO 02/052801 | A1 | 7/2002 |
| WO | 02/091659 | A2 | 11/2002 |
| WO | WO 2006/065182 | A1 | 6/2006 |
| WO | 2007/024167 | | 3/2007 |
| WO | 2007/024168 | | 3/2007 |

OTHER PUBLICATIONS

International Search Report and Written Opinion mailed Apr. 16, 2007 in corresponding PCT application PCT/SE2006/050634.

U.S. Appl. No. 11/617,788, filed Dec. 29, 2006, entitled "Enhancing Coverage for High Speed Downlink Packet Access (HSDPA) Channel".

3GPP TS 25.435 V6.2.0 (Jun. 2005), 3rd Generation Partnership Project; Technical Specification Group Radio Access Network; UTRAN $I_{ub}$ Interface User Plane Protocols for Common Transport Channel Data Streams (Release 6).

3GPP TS 25.425 V6.2.0 (Jun. 2005), 3rd Generation Partnership Project; Technical Specification Group Radio Access Network; UTRAN Iur interface user plane protocols for Common Transport Channel data streams (Release 6).

3GPP TS 45.010 V6.6.0 (Nov. 2005), 3rd Generation Partnership Project; Technical Specification Group GSM/EDGE Radio Access Network; Radio Subsystem Synchronization (Release 6).

3GPP TS 25.402 V6.3.0 (Jun. 2005), 3rd Generation Partnership Project; Technical Specification Group Radio Access Network; Synchronisation in UTRA Stage 2 (Release 6).

3GPP TS 25.215 V6.3.0 (Jun. 2005), 3rd Generation Partnership Project; Technical Specification Group Radio Access Network; Physical Layer—Measurements (FDD) (Release 6).

U.S. Office Action mailed Jul. 23, 2009 in corresponding U.S. Appl. No. 11/617,788.

U.S. Final Office Action mailed Dec. 10, 2009 in U.S. Appl. No. 11/617,788.

3GPP TS 25.433 V6.6.0 (Jun. 2005), 3rd Generation Partnership Project; Technical Specification Group Radio Access Network; UTRAN Iub interface Node B Application Part (NBAP) signaling (Release 6).

* cited by examiner

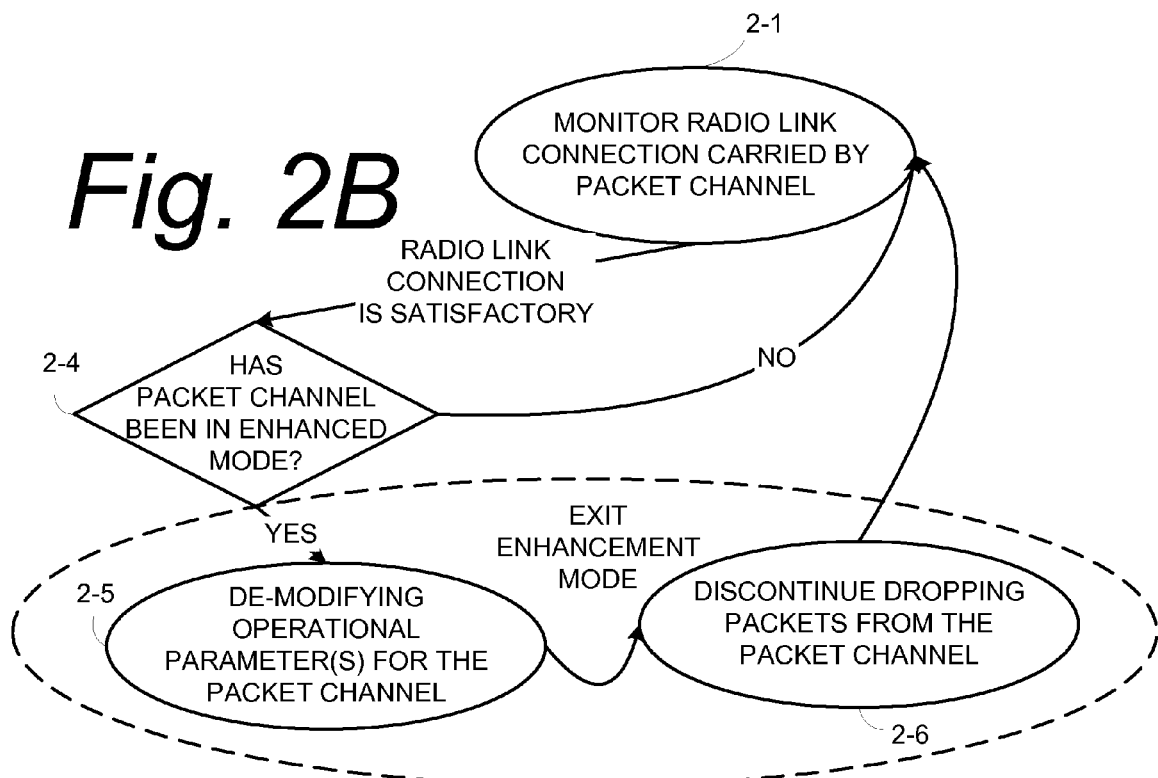

ENHANCED PACKET SERVICE FOR TELECOMMUNICATIONS

This application claims the benefit and priority of U.S. provisional patent application 60/806,437, filed Jun. 30, 2006, entitled "ENHANCED PACKET SERVICE FOR TELECOMMUNICATIONS" which is incorporated by reference herein in its entirety.

This application also incorporates by reference simultaneously filed U.S. patent application Ser. No. 11/617,788, filed Dec. 29, 2006, entitled "ENHANCING COVERAGE FOR HIGH SPEED DOWNLINK PACKET ACCESS (HSDPA) CHANNEL."

BACKGROUND

I. Technical Field

The present invention pertains generally to telecommunications, and particularly to a High Speed Downlink Packet Access (HSDPA) system such as that operated (for example) in a Universal Mobile Telecommunications System (UMTS) terrestrial radio access network (UTRAN).

II. Related Art and Other Considerations

In a typical cellular radio system, mobile terminals (also known as mobile stations and mobile user equipment units (UEs)) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology.

As wireless Internet services have become popular, various services require higher data rates and higher capacity. Although UMTS has been designed to support multi-media wireless services, the maximum data rate is not enough to satisfy the required quality of services.

In a forum known as the Third Generation Partnership Project (3GPP), telecommunications suppliers propose and agree upon standards for third generation networks and UTRAN specifically, and investigate enhanced data rate and radio capacity. One result of the forum's work is the High Speed Downlink Packet Access (HSPA). The High Speed Packet Access (HSPA) enhances the WCDMA specification with High Sped Downlink Packet Access (HSDPA) in the downlink and Enhanced Dedicated Channel (E-DCH) in the uplink. These new channels are designed to support IP based communication efficiently, providing enhanced end-user performance and increased system capacity. Though originally designed for interactive and background applications, they provide as good or even better performance for conversational services than the existing CS bearers.

Concerning High Speed Downlink Packet Access (HSDPA) generally, see, e.g., 3GPP TS 25.435 V6.2.0 (2005-06), 3rd Generation Partnership Project; Technical Specification Group Radio Access Network; UTRAN $I_{ub}$ Interface User Plane Protocols for Common Transport Channel Data Streams (Release 6), which discusses High Speed Downlink Packet Access (HSDPA) and which is incorporated herein by reference in its entirety. Also incorporated by reference herein as being produced by the forum and having some bearing on High Speed Downlink Packet Access (HSDPA) or concepts described herein include: 3GPP TS 25.425 V6.2.0 (2005-06), 3rd Generation Partnership Project; Technical Specification Group Radio Access Network; UTRAN Iur interface user plane protocols for Common Transport Channel data streams (Release 6); and 3GPP TS 25.433 V6.6.0 (2005-06), 3rd Generation Partnership Project; Technical Specification Group Radio Access Network; UTRAN Iub interface Node B Application Part (NBAP) signaling (Release 6).

High Speed Downlink Packet Access (HSDPA) is also discussed in one or more of the following (all of which are incorporated by reference herein in their entirety):

U.S. patent application Ser. No. 11/024,942, filed Dec. 30, 2004, entitled "FLOW CONTROL AT CELL CHANGE FOR HIGH-SPEED DOWNLINK PACKET ACCESS";

U.S. patent application Ser. No. 10/371,199, filed Feb. 24, 2003, entitled "RADIO RESOURCE MANAGEMENT FOR A HIGH SPEED SHARED CHANNEL";

U.S. patent application Ser. No. 11/292,304, filed Dec. 2, 2005, entitled "Flow Control For Low Bitrate Users On High-Speed Downlink";

PCT Patent Application PCT/SE2005/001247, filed Aug. 26, 2005; and

PCT Patent Application PCT/SE2005/001248, filed Aug. 26, 2005.

HSDPA achieves higher data speeds by shifting some of the radio resource coordination and management responsibilities to the base station from the radio network controller. Those responsibilities include one or more of the following (each briefly described below): shared channel transmission, higher order modulation, link adaptation, radio channel dependent scheduling, and hybrid-ARQ with soft combining.

In shared channel transmission, radio resources, like spreading code space and transmission power in the case of CDMA-based transmission, are shared between users using time multiplexing. A high speed-downlink shared channel is one example of shared channel transmission. One significant benefit of shared channel transmission is more efficient utilization of available code resources as compared to dedicated channels. Higher data rates may also be attained using higher order modulation, which is more bandwidth efficient than lower order modulation, when channel conditions are favorable.

The radio base station monitors for the channel quality (CQI) of the high-speed downlink shared channel (HS-DSCH) and manages a priority queue maintained at the radio base station. The base station's priority queue (PQ) stores data which is to be sent on the high-speed downlink shared channel (HS-DSCH) over the air interface to the mobile terminal. In addition, knowing from the monitor the carrier quality of the HS-DSCH, the base station sends to the control node messages which authorize the control node to send more HS-DSCH data frames to the radio base station.

The mobile terminal reports a channel quality indicator (CQI) to the radio base station in charge of the cell. The CQI is a measure of the quality of the common pilot CPICH as reported by each mobile station (e.g., each user equipment unit ("UE")). The channel quality indicator (CQI), together with an expression(s) of capabilities of the mobile terminal, is translated to a bitrate. The bitrate is then further reduced if needed by the radio base station, which results in generation of capacity allocation control frames which are sent to the control node regularly and/or per need bases, e.g. at urgent transitions. The authorizing messages include a "capacity allocation" which can be expressed in various ways, such as in terms of either bitrate or credits, for example. For example, capacity allocation expressed in credits may refer to a number of MAC-d PDUs that the radio network controller (RNC) is allowed to transmit for the MAC-d flow. In response to these authorizing messages, the control node sends further HS-DSCH frames to the radio base station.

The data in the priority queues is sent from a control node to a radio base station in protocol data units (PDUs). A number of PDUs may be included in each high-speed downlink shared channel (HS-DSCH) data frame.

Thus, HSDPA is a shared channel designed for efficient support of packet data applications. Enhancements over dedicated (and shared) channels include fast link adaptation; fast scheduling; Hybrid ARQ from Node B; and a short transmission time interval (TTI). In terms of fast link adaptation, the link adaptation is done by selecting the best modulation and coding scheme based on channel quality indicator from the UE. For fast scheduling, the selection of the user is done in the Node B, which has access to the link quality information, and thus can select the optimal user. Hybrid ARQ from Node B involves having a retransmission mechanism in the base station which allows fast retransmissions and quick recovery of erroneous link adaptation decisions. As a short TTI, a two millisecond (ms) TTI is used for all transmissions.

E-DCH is dedicated channel that has been enhanced for IP transmission. Enhancements include the possibility of using use a shorter TTI; fast hybrid ARQ (HARQ) between mobile terminal and the base station; scheduling of the transmission rates of mobile terminals from the base station; and the fact that E-DCH retains majority of the features characteristic for dedicated channels in the uplink. In terms of fast hybrid ARQ (HARQ) between mobile terminal and the base station, the HARQ mechanism is semi-persistent, as it will abandon a transmission after a fixed number of transmission attempts. The number of transmission attempts is signaled from the RNC to the UE.

Since the uplink transmissions are not orthogonal, E-DCH is power controlled in order to avoid creating excessive interference that might make it impossible to detect other users' signals. The power control comprises two different mechanisms. The first is a inner loop power control which is located in the base station node and which is performed for each ⅔ ms slot. In the inner loop power control, the transmitted power is adjusted so that the measured received signal strength of the Dedicated Physical Control Channel (DPCCH) reaches a pre-defined signal-to-interference ratio (SIR) target. This target is determined by a second mechanism, e.g., an outer loop power control, which tries to maintain a consistent block error rate for selected transmission attempt. The outer loop power control is located at a radio network control (RNC) node.

For delay-critical services such as VoIP, one general system goal is to keep delay within preconfigured boundaries. Rather than to increase transfer delay, the system therefore uses different mechanisms to drop packets when link problems occur. In this regard, both HSDPA and E-DCH can drop PDUs after selected number of retransmissions.

For HSDPA there are several mechanisms that can result in a dropped packet. These mechanisms include one or more of reordering timer(s); delay schedulers; and limited number of retransmissions.

As one mechanism that can result in a dropped packet, a reordering timer (T1 timer) may be utilized to provide or ensure in-order delivery of packets. The UE abandons a PDU if it is not received when the T1 timer expires. Similarly, the Node B will stop transmitting a packet if it has not been received before T1 timer expires.

For voice traffic, it is expected that a second mechanism—a specific scheduler ("delay scheduler")—is used. This scheduler has a settable limit on the maximum queuing delay, after which the packets are dropped in the Node B. As a third and likely future mechanism, there may be a limit on the maximum number of retransmissions.

As with HSDPA, packets can also be dropped for the E-DCH. In particular, a unit in the medium access control (MAC) layer which is responsible for the E-DCH (e.g., a MAC-e entity) in the UE will drop packets after a preconfigured number of transmission attempts. A preconfiguration including the preconfigured number is signaled to the User Equipment (UE) from the network using Radio Resource Control (RRC) protocol, and all standard conforming UEs will need to implement this limitation. While there may be other reasons (such as misinterpretation of the protocol feedback) for packet loss, it is expected that operation which exceeds the number of transmission attempts will be the dominating reason.

For conversational services, it is expected that MAC-e and MAC-hs are the only protocols responsible for performing retransmissions, and so all packet losses on MAC-e and MAC-hs layers will result in application layer packet loss.

For various applications, consecutive packet losses are more harmful than isolated packet losses. Examples of such applications are voice (and other real time) applications and applications based on Transmission Control Protocol (TCP). For voice applications, error concealment can often hide individual packet losses so that the user does not even notice it. However, (sufficiently many) consecutive packet losses cannot be repaired and can lead to noticeable impairments in speech. For these applications the link layer should actually try to minimize the consecutive packet losses. Most TCP based applications can also recover from a single isolated packet loss, but many will create a time-out after just two consecutively lost packets.

Thus, the existing MAC-e and MAC-hs implementations may encounter situations, in which they will either occasionally or typically drop packets, resulting in degraded application performance. Some typical reasons and/or scenarios for packet dropping are discussed below:

In the downlink, the UE may report incorrect channel quality to the base station. This can be expected to happen at the beginning of the transmission, when the UE has not been able to measure the own-signal interference. If this happens, Node B will incorrectly use too low a power, resulting in more than expected transmissions being needed. These extra retransmissions may need more retransmissions than the default T1 timer setting allows. The Node-B has access to the retransmission sequence number, which indicates how many retransmissions have been made for a particular PDU. The signaling is not absolutely necessary, but may help (to avoid unnecessary packet discarding in the reordering functionality. Generally increasing T1 timer is not an option, as especially for conversational applications it is important to keep the value of the T1 timer low in order to allow quick delivery of subsequent packets after a packet loss not caused by poor radio environment. Similar arguments apply also for delay threshold in the scheduler. Delay and T1 settings are based on the delay attribute negotiated for the radio access bearer in question.

In the downlink, the UE may be located in a difficult radio environment, and more than a normal number of retransmissions may be needed, resulting again in T1 timer or delay threshold expiring.

In the uplink, the targeted transmission power is determined by the outer loop power control mechanism. Typically the outer loop power control reduces the transmission power until a block error is observed, and then increases the power again. Due to delay in the control loop, more than one packet is often lost before the target power is raised again.

In the uplink, the UE may not have sufficient transmission power to maintain the current data rate. In this case, the UE may either (1) reduce data rate by transmitting fewer bits per transmission time interval (TTI), or transmit with reduced (insufficient) power (if reducing the number of bits is not possible (e.g. at the cell border, or due to chosen configuration)). Reducing data rate by transmitting fewer bits per transmission time interval (TTI) result in packets being queued in the RLC buffers. Once the buffer is full, a typical implementation will simply drop all incoming packets. When transmitting with reduced (insufficient) power, more retransmissions are needed to transmit the packet. It is possible that the number of retransmissions needed is greater than the configured maximum number of transmissions.

In cases wherein a number of consecutive packets are dropped, such consecutive packet dropping is likely to have a large effect on the application performance.

What is needed therefore, and an object of the present invention, are apparatus, methods, and techniques for better handling packet loss/delay conditions in a telecommunications system.

BRIEF SUMMARY

A packet service enhancement mode and packet service enhancer are provided for operating a packet channel existing over an air interface between a base station node and a user equipment unit of a telecommunications network. As one aspect of the technology, a packet service enhancement method comprises performing a monitoring of a radio link connection carried by the packet channel and, in accordance with the monitoring, both modifying an operational parameter for the packet channel and (optionally) dropping non-consecutive packets from the packet channel.

The packets in the radio link connection are transmitted at an application source rate. The method further comprises dropping the non-consecutive packets from the packet channel to render the application source rate compatible with an available physical channel rate of the packet channel. The act of modifying the operational parameter for the packet channel is performed to prevent premature dropping of a packet due to a prevailing reordering timer timeout setting.

In one example embodiment, the packet channel is a High Speed Downlink Packet Access (HSDPA) channel carrying MAC-hs packets from a network node (Node-B) as the transmitting node to a user equipment unit (UE) as the receiving node. In the HSDPA e(optionally) example embodiment, various alternative or combinatorial ways are provided for monitoring the radio link carried by HSDPA channel for the purpose of detecting deterioration of a radio link connection carried by HSDPA channel. For example, detecting deterioration of a radio link connection carried by HSDPA channel can be realized by detecting expiration of T1 timer; by determining that a packet queue has exceeded a delay threshold; by receiving an indication from a packet scheduler that MAC-hs packets are not being expeditiously scheduled for transmission on the HSDPA channel; and by a determination based on a channel quality indicator (CQI) which is periodically reported by the UE. In the HSDPA example embodiment, the step or act of modifying the operational parameter for the packet channel can comprise (for example) increasing temporarily a delay threshold in a packet scheduler of the Node-B or temporarily increasing total received energy of packets transmitted on the HSDPA channel, e.g., by increasing transmission power for HSDPA channel.

In another example embodiment, the packet channel is a E-DCH Packet Access (uplink) channel carrying MAC-e packets from a user equipment unit (UE) as the transmitting node to a network node (Node-B) as the receiving node. In the E-DCH example embodiment, various alternative or combinatorial ways are provided for monitoring the radio link carried by the E-DCH channel for the purpose of detecting deterioration of a radio link connection carried by the E-DCH channel. The link quality can be detected based on various measurements or signals, such as by monitoring a number of transmission attempts for each packet; by counting the number of times the (preconfigured) maximum number of transmissions attempts have been exceeded; by monitoring the number of adandoned packets; and by measuring the actual power needed to transmit the packets over the E-DCH channel. In the E-DCH example embodiment, the act of modifying the operational parameter for the packet channel can comprise (for example) increasing the transmission power to ensure that the subsequent packet(s) is/are correctly received, or exceeding the configured maximum number of transmissions.

In its various embodiment and modes, the act of dropping the non-consecutive packets from the packet channel can comprise dropping non-consecutive packets according to a predetermined strategy. For examples, the predetermined strategy of dropping the non-consecutive packets from the packet channel can comprise one or more of the following: (1) dropping packets according to a probability theory; (2) dropping packets based on packet size; (3) dropping packets based on packet content; and (4) dropping every $n^{th}$ packet, wherein n is a positive integer greater than two. Furthermore, the act of dropping the non-consecutive packets from the packet channel can comprise one of: (1) dropping packets already queued in a packet queue; (2) dropping incoming packets before entry into a packet queue; (3) a combination of (1) and (2).

The enhancement mode of operation is exited after a predetermined number of successful transmissions have occurred on the packet channel, the exiting of the enhancement mode of operation can comprise: de-modifying the operational parameter for the packet channel; and removing a requirement of dropping non-consecutive packets from the packet channel.

In one of its aspects, the technology also encompasses a base station node of a telecommunications system which transmits a downlink HSDPA packet channel existing over an air interface between the base station node and a user equipment unit. The base station (e.g., Node-B) comprises, e.g., means for modifying an operational parameter for the packet channel and means for dropping non-consecutive packets from the packet channel.

In another of its aspects, the technology also encompasses a mobile station (e.g., a user equipment unit) which transmits an uplink E-DCH packet channel existing over an air interface between a base station node and a user equipment unit. The user equipment unit (UE) comprises a detector for detecting deterioration of a radio link connection carried by the packet channel, and means for dropping non-consecutive packets from the packet channel.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2B is a diagrammatic view showing general, representative, example acts performed by packet service enhancer upon exiting an enhancement mode of a packet channel.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
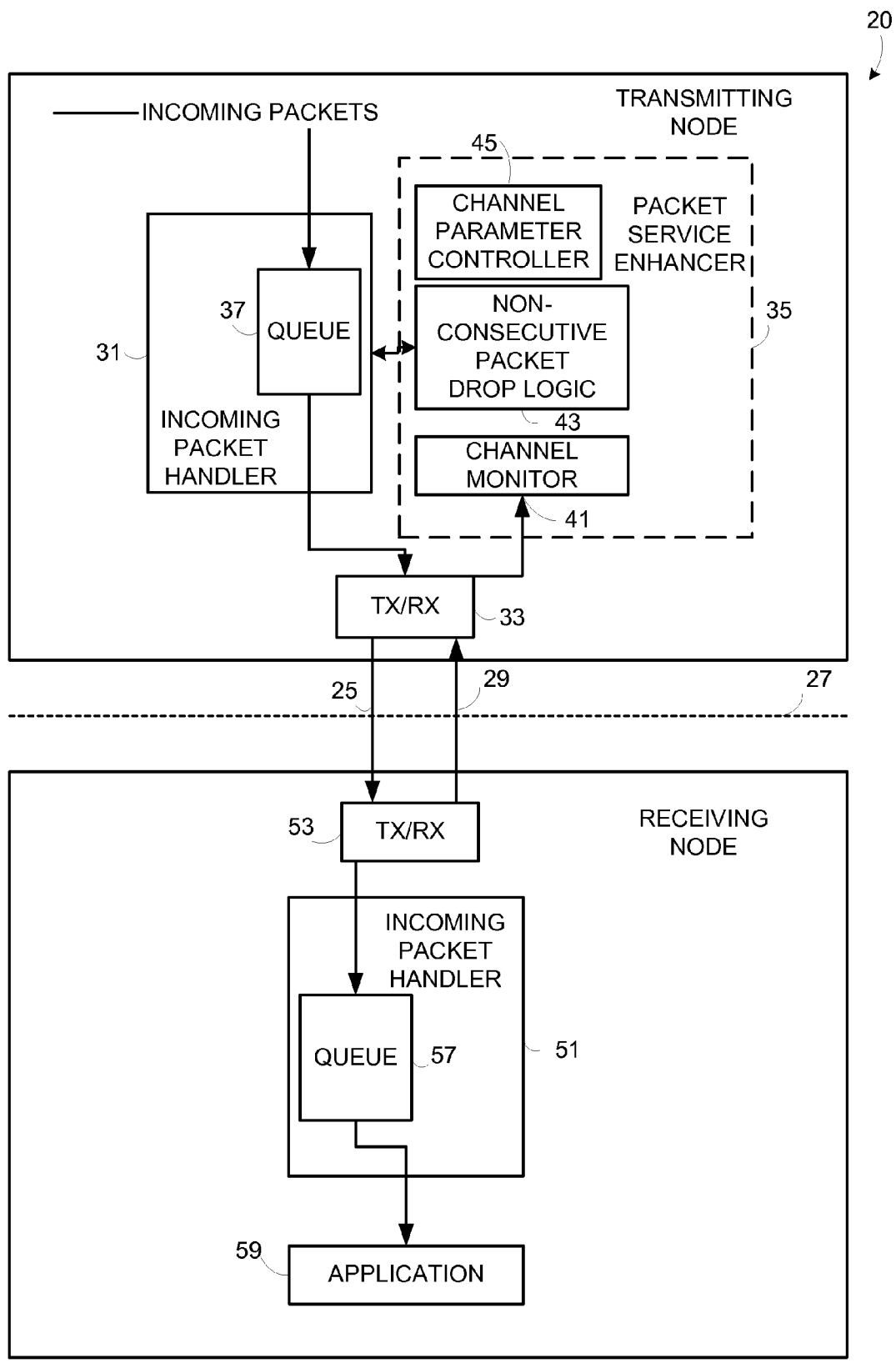
FIG. 1 is a schematic view of a telecommunications system, including both a transmitting node and a receiving node, and wherein the transmitting node includes a packet service enhancer in conjunction with a packet channel.

Basic aspects of an example generic embodiment of the technology are illustrated in by the telecommunications system 20 shown in FIG. 1. For sake of clarity, telecommunications system 20 is shown as simply comprising a transmitting node 21 and a receiving node 23. The telecommunications system 20 is configured so that a packet channel 25 exists over an air interface 27 between transmitting node 21 and receiving node 23. In accordance with differing example embodiments, some of which are described in more detail hereinafter, the packet channel 25 can be (for example) a High Speed Downlink Packet Access (HSDPA) channel or an E-DCH (uplink) channel. The packet channel 25 is transmitted in a first direction across the air interface 27 (e.g., from transmitting node 21 to receiving node 23). Likely one or more packet channels, such as packet channel 29, is transmitted in a second direction across air interface 27 (e.g., from receiving node 23 to transmitting node 21).

To the extent here pertinent, transmitting node 21 is shown as including a packet handler 31; a transceiver 33; and a packet service enhancer functionality or unit 35. The packet handler 31 includes a packet queue 37 into which packets incoming to transmitting node 21 are stored, and from which packets are extracted for inclusion in the packet channel and transmission over air interface 27 to receiving node 23. The packet service enhancer 35 further includes channel monitor 41; non-consecutive packet drop logic 43; and channel parameter controller 45.

In similar manner, receiving node 23 includes a packet handler 51 and a transceiver 53. The packet handler 51 includes a packet queue 57 into which packets incoming on packet channel 25 to receiving node 23 from transmitting node 21 are stored, and from which packets are extracted for use in an application 59 performed or executed by receiving node 23. Such service or application can be, for example, voice over Internet Protocol (VoIP). In some instances, the application 59 may be within the receiving node 23; in other cases the application 59 may be in a further node or network beyond the receiving node 23.

Figure 2:
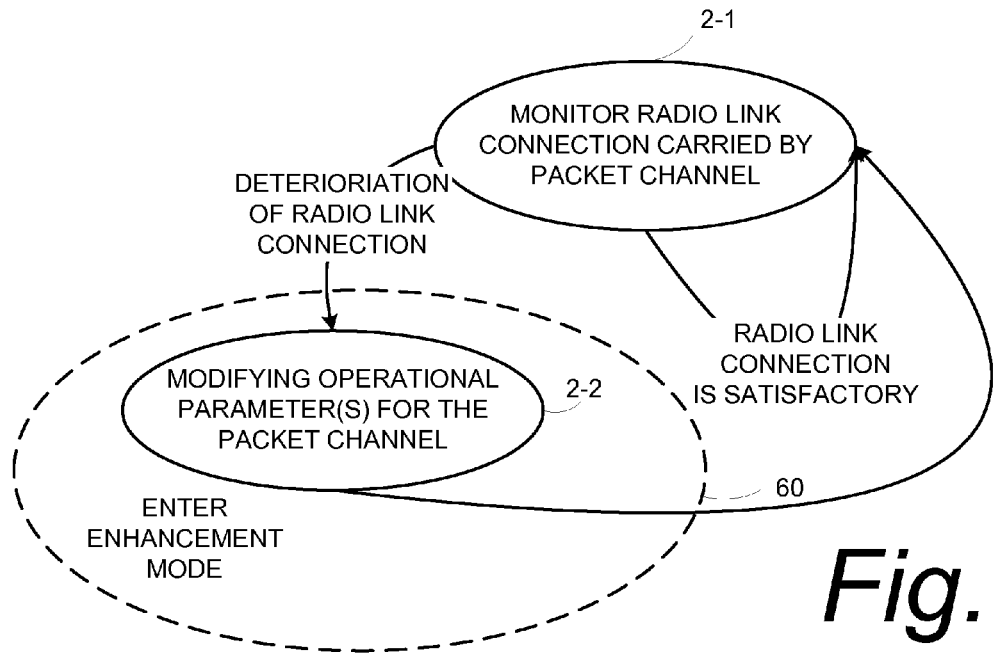
FIG. 2 is a diagrammatic view showing general, representative, example acts performed by packet service enhancer of a transmitting node for ensuring satisfactory operation of a packet channel, including an enhancement mode comprising an act of changing an operational parameter for a packet channel.
Figure 2A:
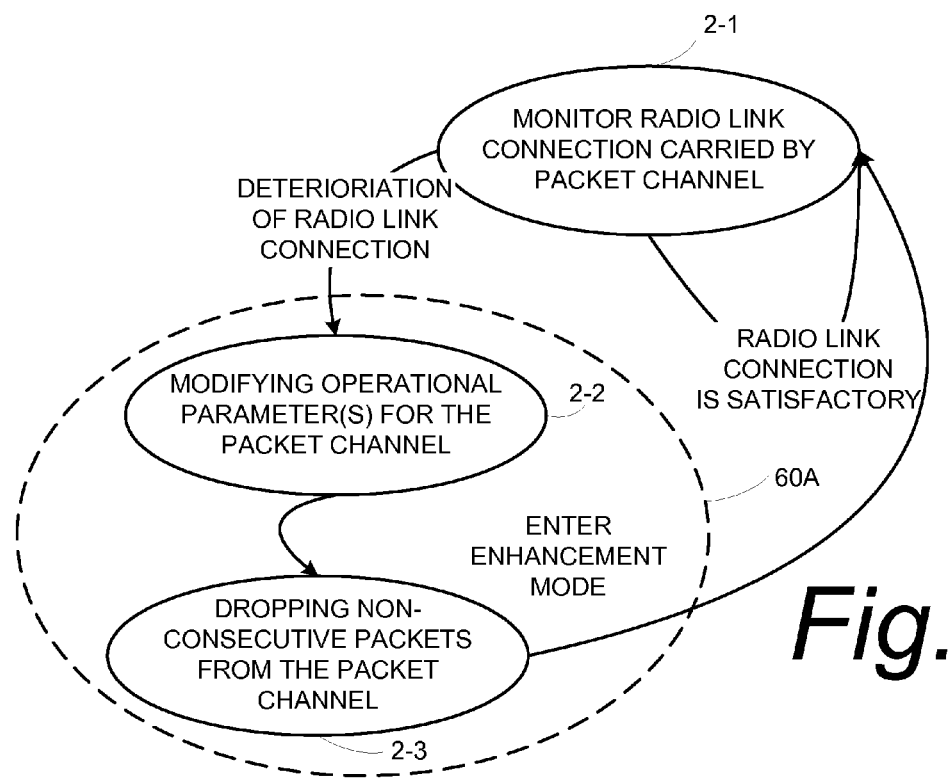
FIG. 2A is a diagrammatic view showing general, representative, example acts performed by packet service enhancer of a transmitting node for ensuring satisfactory operation of a packet channel, including an enhancement mode comprising not only an act of changing an operational parameter for a packet channel, but also of dropping non-consecutive packets.

FIG. 2 and FIG. 2A show general, representative, example steps or acts performed by packet service enhancer 35 of transmitting node 21 for ensuring satisfactory operation of packet channel 25, and particularly including an enhancement mode. The enhancement mode of FIG. 2 is more basic and simplified than that of FIG. 2A. In this regard, the enhancement mode of FIG. 2 comprises an act of changing an operational parameter for a packet channel. The enhancement mode of FIG. 2A comprises not only an act of changing an operational parameter for a packet channel, but also of dropping non-consecutive packets.

The acts of FIG. 2 and FIG. 2A are understood to be performed in conjunction with on-going operation of packet channel 25, e.g., the reception by transmitting node 21 of packets from a packet source (e.g., an application, such as VoIP); the storing of packets received from the packet source in packet queue 37; transmission of packets stored in packet queue 37 on a radio link across air interface 27 to receiving node 23; reception by receiving node 23 of the transmitted packets; and, storage of the packets received by receiving node 23 in packet queue 57 for use by application 59.

As act 2-1 of FIG. 2, the channel monitor 41 of packet service enhancer 35 monitors a radio link carried by packet channel 25 for the purpose of detecting deterioration of a radio link connection carried by packet channel 25. In accordance with the monitoring, e.g., if sufficient deterioration is indeed detected, an enhancement mode (illustrated by broken line 60 in FIG. 2) may be entered.

In simple terms, the enhancement mode 60 for the FIG. 2 mode basically involves performing act 2-2. As act 2-2 the channel parameter controller 45 modifies an operational parameter for packet channel 25.

The enhancement mode 60A for the FIG. 2A mode involves performing both act 2-2 and act 2-3. As act 2-3, which follows or is performed in conjunction with act 2-2 in the FIG. 2A mode, non-consecutive packets are dropped from packet queue 37 by non-consecutive packet drop logic 43. Preferably, the packets in the radio link connection are transmitted at an application source rate. The act (2-3) of dropping the non-consecutive packets from the packet channel preferably renders the application source rate compatible with an available physical channel rate of the packet channel 25. The act (act 2-2) of modifying the operational parameter(s) for packet channel 25 is performed to prevent premature dropping of a packet due to a prevailing reordering timer timeout setting.

FIG. 2B shows act 2-1 of FIG. 2, and further acts which are preferably performed when it is determined at act 2-1 that the quality of radio link connection carried by packet channel 25 is no longer such (e.g., no longer deteriorated) that enhancement mode 60 is required. When it is determined that the radio link connection has satisfactory quality, a determination is made at act 2-4 whether packet channel 25 has been in enhanced mode (e.g., whether enhancement mode 60 is still, but now unnecessarily, in effect). If not, the monitoring of act 2-1 continues. But if enhancement mode 60 has been in effect, as act 2-5 channel parameter controller 45 demodifies the modified operational parameters for packet channel 25 (e.g., returns the operational parameter(s) to their previous value(s), e.g., normal or default values). Further, as act 2-6, non-consecutive packet drop logic 43 discontinues its strategy of dropping packets from packet channel 25. Thus, FIG. 2B shows example acts involved in exiting from enhancement mode 60.

In some example implementations and embodiments, including examples discussed herein after, the packets transmitted on the packet channel 25 can be MAC-hs packets (when packet channel 25 is a High Speed Downlink Packet Access (HSDPA) channel). In other some example implementations and embodiments, including other examples discussed hereinafter, the packets transmitted on the packet channel 25 can be MAC-e packets (when packet channel 25 is a E-DCH (uplink) channel). Both the MAC-hs and MAC-e scenario involve use of packet channel 25 for a mobile station, e.g., a user equipment unit (UE). In the MAC-hs scenario, the user equipment unit is the receiving node 23; in the MAC-e scenario, the user equipment unit is the transmitting node 21.

FIG. 2A generically represents either the MAC-hs or the MAC-e scenario, with the method of operating packet channel 25 comprising three basic acts: (1) detecting (act 2-1) that the radio link connection of a given mobile station (e.g., UE) is bad, e.g. by failing transmission of a MAC-e or MAC-hs packets; (2) temporarily enforcing or relaxing (act 2-2) the delay requirements of the packet service (e.g., VoIP) and assigning extra resources for the transmission; and (3) monitoring or following the queue size of the RLC/MAC-hs buffers and dropping non-consecutive packets in order to match the application source rate to the available physical channel data rate (act 2-3).

In conjunction with act 2-2, it may be necessary to indicate to receiving node 23 when the resulting delay will be beyond a reordering timer setting, in order to prevent the receiver entity from discarding the packet prematurely due to reordering timer timeout.

There are two complementary considerations for undertaking the actions of the acts of FIG. 2A. A first consideration is that a temporarily increased delay for the transmission implies a more graceful degradation of the user-perceived quality than dropping packets. A second consideration is that, when having to drop packets, quality benefits from dropping non-consecutive packets than consecutive packets. The improved quality can (as usual) be traded for increased capacity if desired.

Figure 3:
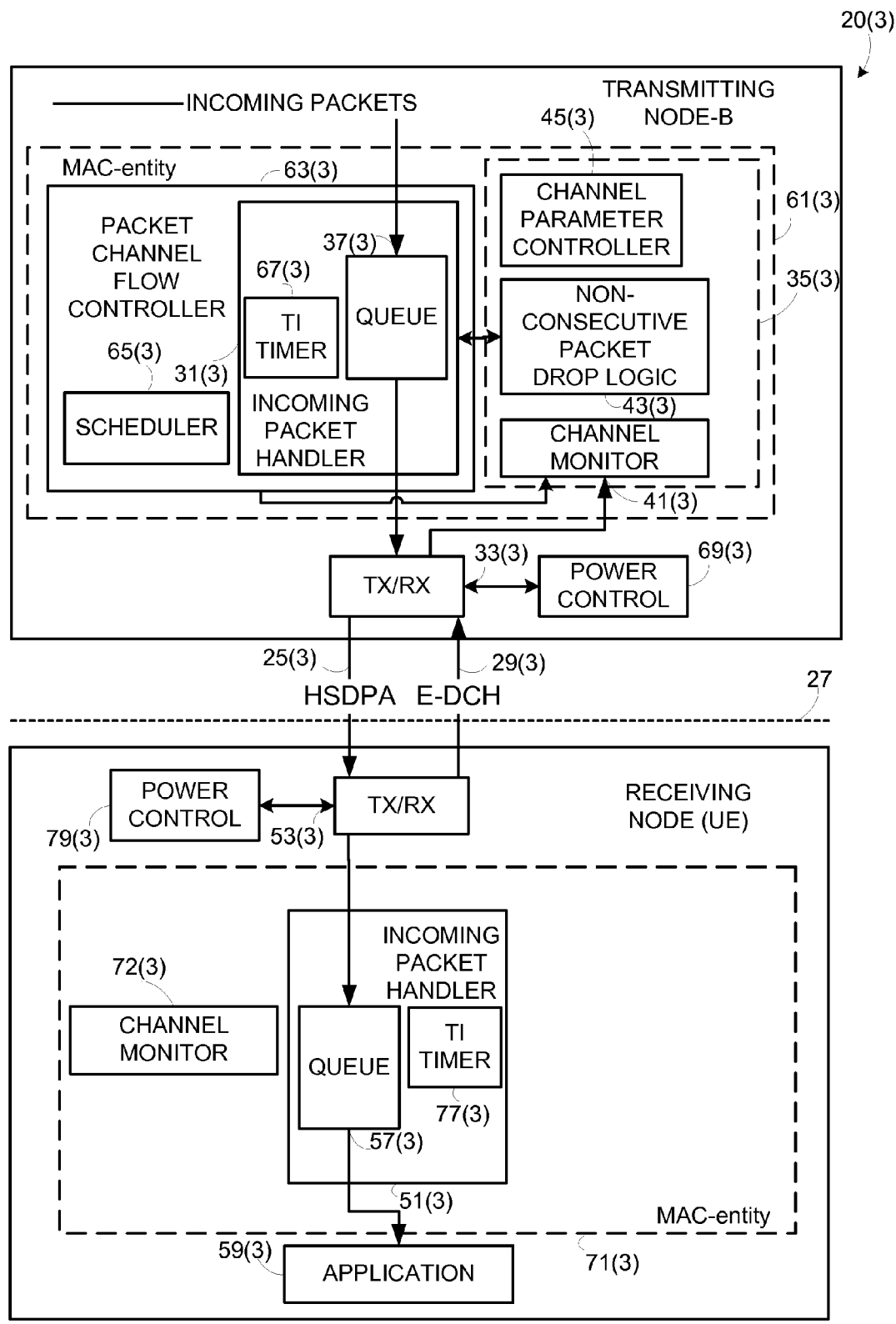
FIG. 3 is a schematic view of an example telecommunications system wherein the packet channel is a HSDPA channel, and wherein the transmitting node is a Node-B which includes a packet service enhancer for the HSDPA channel.

FIG. 3 illustrates a example embodiment wherein the packet channel is a High Speed Downlink Packet Access (HSDPA) channel carrying MAC-hs packets from a network node (Node-B) as the transmitting node 21(3) to a user equipment unit (UE) as the receiving node 23(3). Packets carried on the HSDPA channel 25(3) of FIG. 3 are obtained or formed from incoming packets, e.g., incoming Service Data Units (SDUs). The SDUs each have a sequence number (e.g., a Transmission Sequence Number [TSN]) which can be utilized for re-ordering the incoming SDUs in case they are not received in TSN order.

As such, in the FIG. 3 embodiment, transmitting Node-B 21(3) includes a MAC entity 61(3). The MAC entity 61(3) of Node-B 21(3) hosts or includes both packet channel flow controller 63(3) and packet service enhancer 35(3). The packet service enhancer 35(3) essentially includes the same constituent functional units as shown in FIG. 1: channel monitor 41(3); non-consecutive packet drop logic 43(3); and channel parameter controller 45(3). The packet channel flow controller 63(3) in turn can include, or work in conjunction with, packet handler 31(3) and further include a packet scheduler 65(3). The packet handler 31(3), in addition to comprising packet queue 37(3), also comprises T1 timer 67(3). T1 timer 67(3) is initialized by detecting a missing PDU (e.g., by receiving a next PDU after a missing PDU). In addition, Node-B 21(3) includes a power control unit 69(3) which serves to control the power applied to or utilized by transceiver 33(3).

The receiving node 23(3) of FIG. 3, preferably in the form of a user equipment unit (UE), also includes a MAC entity (shown as MAC entity 71(3)). The MAC entity 71(3) of UE 23(3) hosts packet handler 51(3), as well as channel monitor 72(3). The packet handler 51(3) includes, in addition to packet queue 57(3), its own T1 timer 77(3). UE 23(3) includes a power control unit 79(3) which serves to control the power applied to or utilized by its transceiver 53(3).

Figure 4:
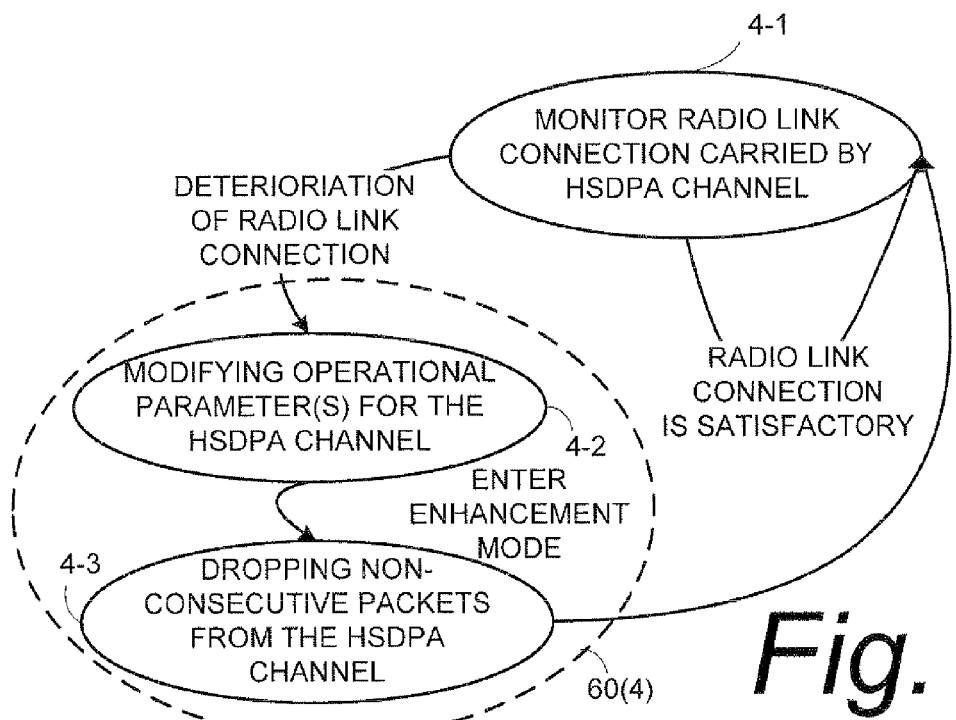
FIG. 4 is a diagrammatic view showing general, representative, example acts performed by packet service enhancer of Node-B of FIG. 3 for ensuring satisfactory operation of a HSDPA channel.

In like manner as FIG. 2, FIG. 4 illustrates basic example acts performed in conjunction with the HSDPA channel 25(3) by packet service enhancer 35(3) of FIG. 3. FIG. 4 differs from FIG. 2 by specifically illustrating the packet channel 25(3) as a HSDPA channel, and by the prefix of the act numbers.

As act 4-1 of FIG. 4, the channel monitor 41(3) of packet service enhancer 35(3) monitors a radio link carried by HSDPA channel 25(3)(3) for the purpose of detecting deterioration of a radio link connection carried by HSDPA channel 25(3). In accordance with the monitoring, e.g., if sufficient deterioration is indeed detected, an enhancement mode (illustrated by broken line 60(4) in FIG. 4) may be entered. In simple terms, the enhancement mode 60(4) basically involves performing act 4-2 and act 4-3 of FIG. 4. As act 4-2 the channel parameter controller 45(3) modifies an operational parameter for HSDPA channel 25(3). In addition, as act 4-3 non-consecutive packets are dropped from packet queue 37(3) by non-consecutive packet drop logic 43(3). The act (4-3) of dropping the non-consecutive packets from the packet channel preferably renders the application source rate compatible with an available physical channel rate of HSDPA channel 25(3).

Figure 4A:
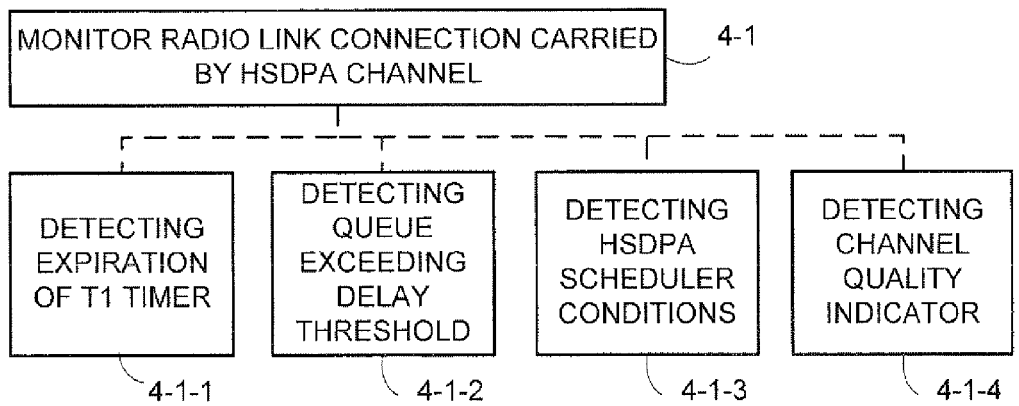
FIG. 4A is a diagrammatic view showing example subacts of act 4-1 of FIG. 4.

FIG. 4A illustrates various alternative or combinatorial ways of performing act 4-1, e.g., monitoring the radio link carried by HSDPA channel 25(3) for the purpose of detecting deterioration of a radio link connection carried by HSDPA channel 25(3). In this regard, the channel monitor 41(3) of MAC-hs entity 61(3) can detect the link quality based on various measurements or signals. Subact 4-1-1 of FIG. 4A shows channel monitor 41(3) detecting deterioration of a radio link connection carried by HSDPA channel 25(3) by detecting expiration of T1 timer 67(3). Expiration of T1 timer 67(3) generally indicates that a predetermined time interval has elapsed since proper packeting ordering has been lost (e.g., since one out-of-sequence packet has not been accounted for), and thus can be used as an indication of quality of the radio link connection carried by HSDPA channel 25(3). Subact 4-1-2 of FIG. 4A shows channel monitor 41(3) detecting deterioration of a radio link connection carried by HSDPA channel 25(3) by determining that packet queue 37(3) has exceeded a delay threshold. Subact 4-1-3 of FIG. 4A shows channel monitor 41(3) detecting deterioration of a radio link connection carried by HSDPA channel 25(3) by receiving an indication from packet scheduler 65(3) that MAC-hs packets are not being expeditiously scheduled for transmission on HSDPA channel 25(3) from Node-B 21 to UE 23. Subact 4-1-4 of FIG. 4A shows channel monitor 41(3) detecting deterioration of a radio link connection carried by HSDPA channel 25(3) by based on a channel quality indicator (CQI) which is periodically reported by the UE in conventional fashion. Subact 4-1-4, the CQI reporting by UE 23, is likely the most straightforward measure of HSDPA channel deterioration. The CQI uses the DPCCH with spreading factor=256 that is code multiplexed with the existing dedicated uplink physical channels (generally called the HS-DPCCH).

Act 4-2 of FIG. 4 involves (when necessary in view of the monitoring of act 4-1), modifying an operational parameter for HSDPA channel 25(3). One example way of modifying an operational parameter for HSDPA channel is to relax a delay requirement for the HSDPA channel 25(3), e.g., MAC-hs increasing the total allowed transmission time of a (voice) frame for the HSDPA channel 25(3).

Figure 4B:
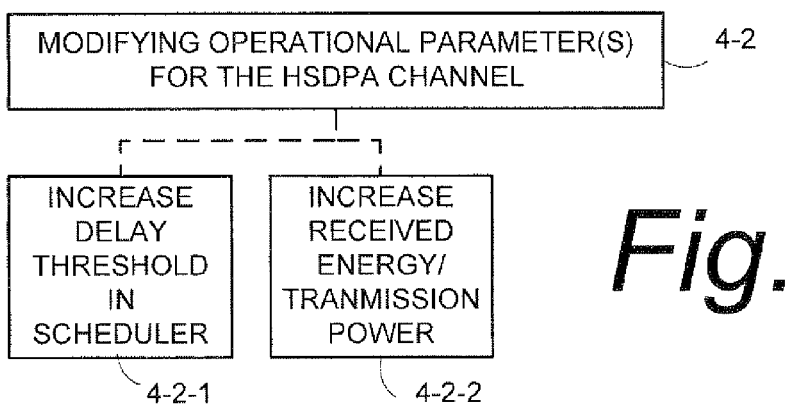
FIG. 4B is a diagrammatic view showing example subacts of act 4-2 of FIG. 4.

Modification of the delay requirement for the HSDPA channel 25(3) can be accomplished with one or more subacts, such as subact 4-2-1 and/or subact 4-2-2 shown in FIG. 4B. The subact 4-2-1 and subact 4-2-2 can be implemented alternatively, or in combination.

As subact 4-2-1, the channel parameter controller 45(3) can increase temporarily a delay threshold in packet scheduler 65(3) of Node-B 21(3). In other words, by increasing the delay threshold of packet scheduler 65(3), more retransmissions can be used for MAC-hs PDUs. With a standard scheduler algorithm using both link quality and delay as input, a higher delay threshold will increase the probability for successful packet transfer before timeout, and thus reduce probability of packet loss at the expense of delay.

As subact 4-2-2, to modify the delay requirement for the HSDPA channel 25(3) the channel parameter controller 45(3) can temporarily increase total received energy of packets transmitted on the HSDPA channel 25(3), e.g., by increasing transmission power for HSDPA channel 25(3). Power increase reduces the probability of packet loss, but can only be applied when there is extra power available. Thus, in order to implement subact 4-2-2, channel parameter controller 45(3) works in conjunction with power control unit 69(3) both to discern power available status and to change transmission power when appropriate.

If using more retransmissions (act 4-2-1) or an increased delay threshold does not result in a delay that exceeds the reordering (T1) timer (e.g., T1 timer 77(3)) in UE 23(3), no indication to UE 23(3) is needed. The UE 23(3) only needs to be informed about retransmissions if the UE 23(3) has already received a next packet. So, in one example implementation the Node-B 21(3) does not signal the new retransmissions to the UE 23(3) and thus avoids any further transmissions in order not to trigger the TI timer 77(3) in the UE 23(3). In other embodiments, if it is desired to communicate to the UE 23(3) that the Node-B 21(3) is still trying to send the packet, such information can be signaled to UE 23(3) in various ways. A first such signaling can be by adding a specific signal to the MAC-hs header (e.g. a specific New Data Indicator [NDI] value or sequence of values). A second such signaling can be by indicating the need to an RNC node, which can then signal a new T1 value to the UE 23(3) and to its T1 timer 77(3) using RRC signaling. A third such signaling can be by standardizing a rule which says that UE 23(3) should not abandon a packet if it has been scheduled to while T1 timer 77(3) is running. This third signaling option should preferably be configurable per radio bearer, and advantageously does not require any extra signaling over the radio interface.

As act 4-3 of FIG. 4, the non-consecutive packet drop logic 43(3) of MAC-hs entity 61(3) maintains the level of packet queue 37(3) below a (e.g., predetermined) limit by dropping incoming packets in such a way that no consecutive packets are lost. For example, this can be achieved by implementing an incoming packet counter c, and only dropping every $x^{th}$ incoming packet. A predetermined strategy of dropping the non-consecutive packets from the packet channel can be any one or more of the following: (1) dropping packets according to a probability theory (e.g., as is understood from Random Early Detection Mechanism); (2) dropping packets based on packet size; (3) dropping packets based on packet content; (4) dropping every $n^{th}$ packet, wherein n is a positive integer greater than two.

In conjunction with packet drop strategy, it should be realized that the act of dropping the non-consecutive packets from the packet channel can comprise one of: (1) dropping packets already queued in a packet queue; (2) dropping incoming packets before entry into a packet queue; (3) a combination of (1) and (2).

Exit from the enhancement mode 60(4) of FIG. 4 can occur in like manner as illustrated in FIG. 4A. That is, upon noticing, e.g., a sufficient number of successful transmissions, packet service enhancer 35(3) leaves its enhancement mode 60(4). In other words, once packet service enhancer 35(3) has noticed (e.g., at act 4-1) that a sufficient number of successful transmissions have occurred on the HSDPA channel 25(3), the operational parameters are de-modified to resume normal HSDPA channel operation. For example, the operational parameters may be de-modified so that HSDPA channel 25(3) again starts to obey the configured limit on maximum number of transmissions.

Figure 5:
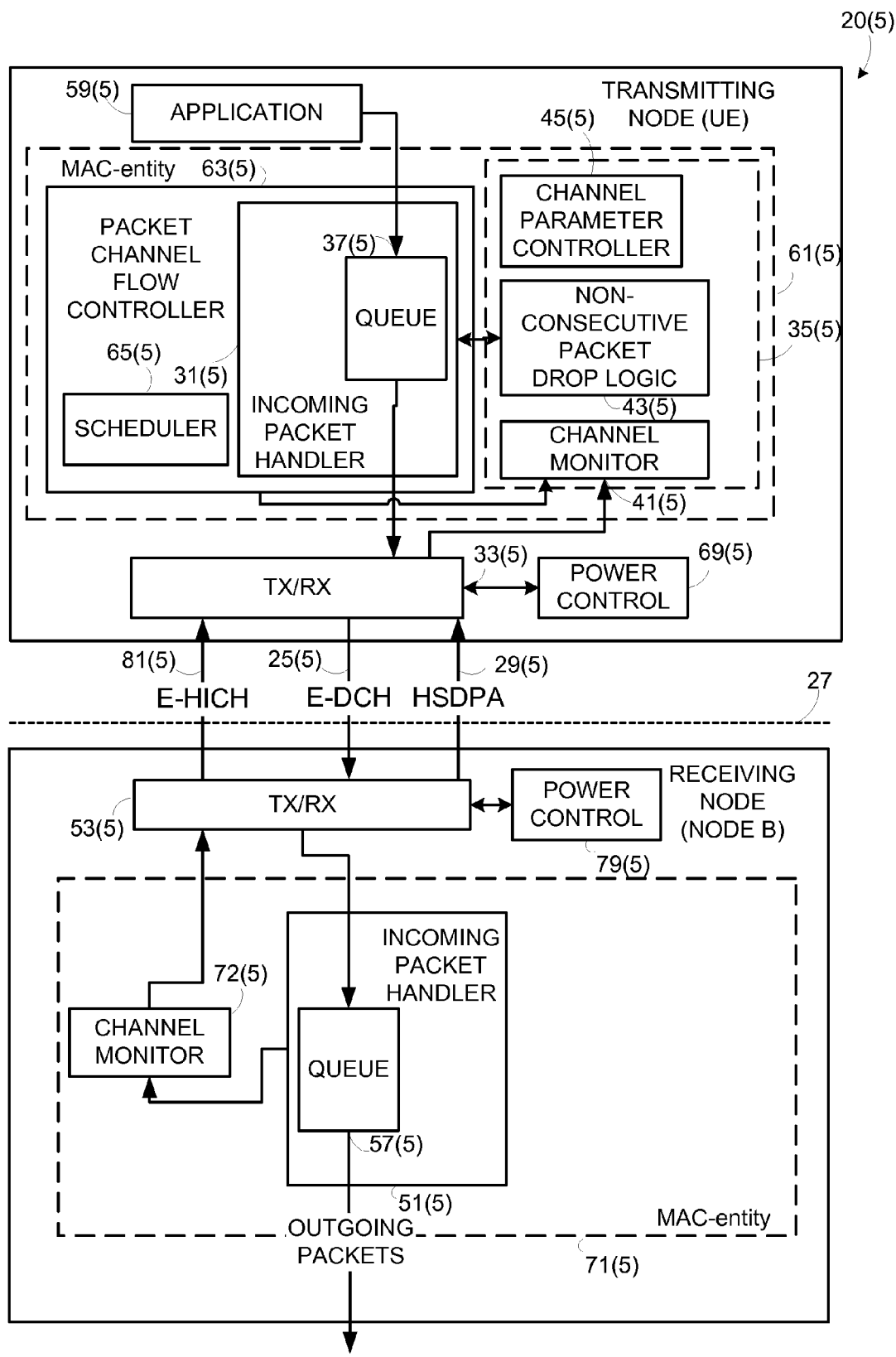
FIG. 5 is a schematic view of an example telecommunications system wherein the packet channel is an E-DCH channel, and wherein the transmitting node is a user equipment unit which includes a packet service enhancer for the E-DCH channel.

FIG. 5 illustrates a example embodiment wherein the packet channel is a E-DCH Packet Access (uplink) channel carrying MAC-e packets from a user equipment unit (UE) 21(5) as the transmitting node to network node (Node-B) as the receiving node 23(5). As such, in the FIG. 5 embodiment, transmitting UE 21(5) includes a MAC entity 61(5). The MAC entity 61(5) of UE 21(5) hosts or includes both packet channel flow controller 63(5) and packet service enhancer 35(5). The packet service enhancer 35(5) essentially includes the same constituent functional units as shown in FIG. 1: channel monitor 41(5); non-consecutive packet drop logic 43(5); and channel parameter controller 45(5). The packet channel flow controller 63(5) in turn can include, or work in conjunction with, packet handler 31(5) and further include a packet scheduler 65(5). The packet handler 31(5) includes packet queue 37(5). In addition, UE 21(5) includes a power control unit 69(5) which serves to control the power applied to or utilized by transceiver 33(5).

The receiving node 23(3) of FIG. 5, preferably in the form of a network node such as a Node-B, also includes a MAC entity (shown as MAC entity 71(5)). The MAC entity 71(5) of Node-B 23(5) hosts packet handler 51(5), as well as channel monitor 72(5). The packet handler 51(5) includes packet queue 57(5). Node-B 23(5) includes a power control unit 79(5) which serves to control the power applied to or utilized by its transceiver 53(5).

During normal MAC-e protocol operation, the UE MAC-e protocol entity transmits packets on the E-DCH channel 25(5) to Node-B 23(5) until at least one acknowledgement (ACK) is received by UE 21(5) on a feedback channel, e.g., on the E-DCH HARQ Acknowledgement Indicator Channel (E-HICH). The E-HICH is illustrated as channel 81 in FIG. 5.

Figure 6:
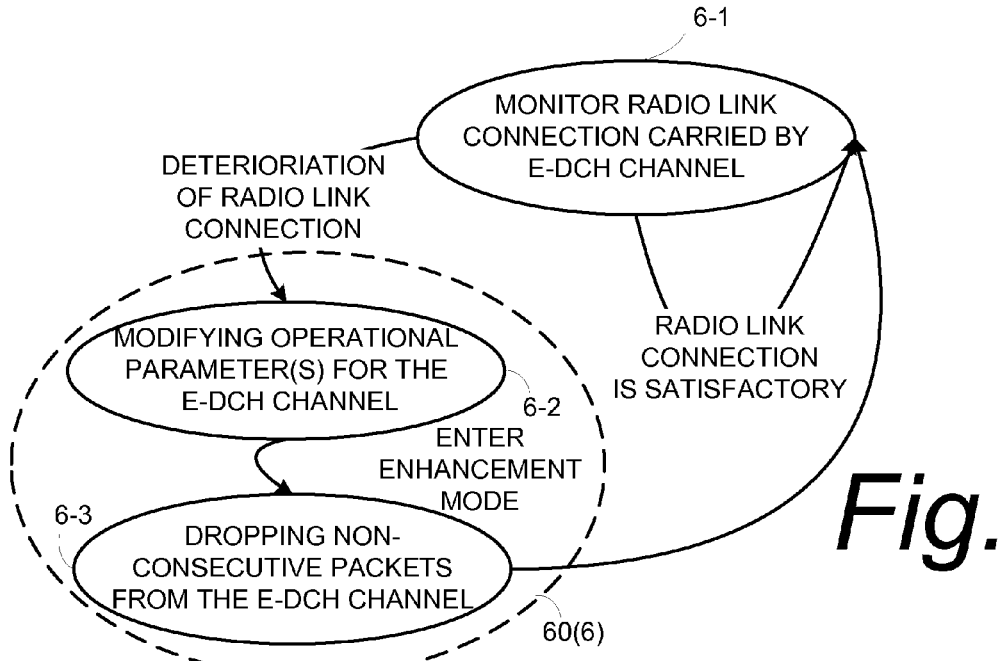
FIG. 6 is a diagrammatic view showing general, representative, example acts performed by packet service enhancer of the user equipment unit of FIG. 5 for ensuring satisfactory operation of an E-DCH channel.

In like manner as FIG. 2, FIG. 6 illustrates basic example steps or acts performed in conjunction with the E-DCH channel 25(5) by packet service enhancer 35(5) of FIG. 5. FIG. 6 differs from FIG. 2 by specifically illustrating packet channel 25 as an E-DCH channel, and by the prefix of the act numbers.

As act 6-1 of FIG. 6, the channel monitor 41(5) of packet service enhancer 35(5) monitors a radio link carried by E-DCH channel 25(5) for the purpose of detecting deterioration of a radio link connection carried by E-DCH channel 25(5). In accordance with the monitoring, e.g., if sufficient deterioration is indeed detected, an enhancement mode (illustrated by broken line 60(6) in FIG. 6) may be entered. In simple terms, the enhancement mode 60(6) basically involves performing act 6-2 and act 6-3 of FIG. 6. As act 6-2 the channel parameter controller 45(5) modifies an operational parameter for E-DCH channel 25(5). In addition, as act 6-3 non-consecutive packets are dropped from packet queue 37(5) by non-consecutive packet drop logic 43(5). The act (6-3) of dropping the non-consecutive packets from the packet channel preferably renders the application source rate compatible with an available physical channel rate of E-DCH channel 25(5).

Figure 6A:
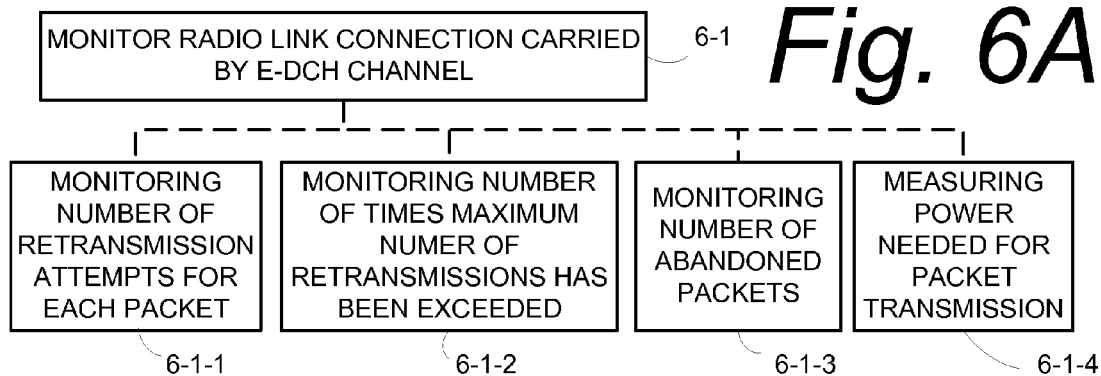
FIG. 6A is a diagrammatic view showing example subacts of act 6-1 of FIG. 6.

FIG. 6A illustrates various alternative or combinatorial ways of performing act 6-1, e.g., monitoring the radio link carried by E-DCH channel 25(5) for the purpose of detecting deterioration of a radio link connection carried by E-DCH channel 25(5).

In this regard, the channel monitor 41(5) of MAC-e entity 61(5) can detect the link quality based on various measurements or signals. Subact 6-1-1 of FIG. 6A shows channel monitor 41(5) detecting deterioration of a radio link connection carried by E-DCH channel 25(5) by monitoring the number of transmission attempts for each packet. Subact 6-1-2 of FIG. 6A shows channel monitor 41(5) detecting deterioration of a radio link connection carried by E-DCH channel 25(5) by counting the number of times the (preconfigured) maximum number of transmissions attempts have been exceeded. Subact 6-1-3 of FIG. 6A shows channel monitor 41(5) detecting deterioration of a radio link connection carried by E-DCH channel 25(5) by monitoring the number of abandoned packets. Subact 6-1-4 of FIG. 6A shows channel monitor 41(5) detecting deterioration of a radio link connection carried by E-DCH channel 25(5) by measuring the actual power needed to transmit the packets over the E-DCH channel 25(5).

Act 6-2 of FIG. 6 involves (when necessary in view of the monitoring of act 4-1), modifying an operational parameter for E-DCH channel 25(5). One example way of modifying an operational parameter for the E-DCH channel is to enforce or relax a delay requirement for the E-DCH channel 25(5), e.g., MAC-e increasing the total received energy of transmitted packets.

Figure 6B:
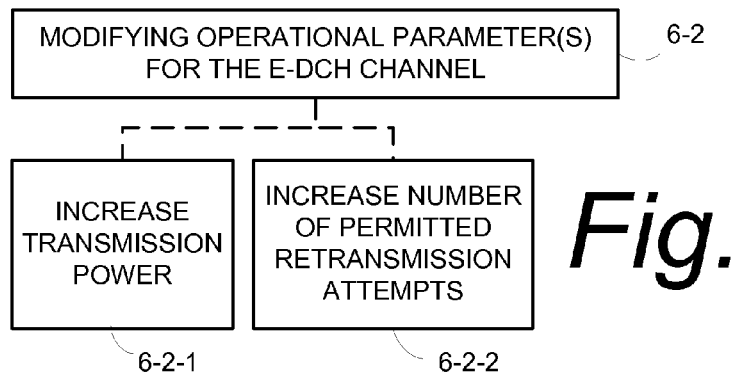
FIG. 6B is a diagrammatic view showing example subacts of act 6-2 of FIG. 6.

Increasing the total received energy of transmitted packets, and thus enforcing the delay requirement for the E-DCH channel 25(5) can be accomplished with one or more subacts, such as subact 6-2-1 or subact 6-2-2 shown in FIG. 6B. The subact 6-2-1 and subact 6-2-2 can be implemented alternatively.

If the UE 21(5) is not operating at the maximum power (as determined by consulting power control 69(5)), it is likely that the transmission failed due to the aforementioned outer loop power control mechanism supervised by the radio network control (RNC) node. In such case, the UE 21(5) can simply increase the transmission power to ensure that the subsequent packet(s) is/are correctly received. Increase of transmission power, directed of power control 69(5) by channel parameter controller 45(5), is reflected by subact 6-2-1 of FIG. 6B.

If the UE 21(5) is already operating at the maximum power, UE 21(5) cannot increase the transmission power further. In such case it is necessary to increase the number of transmission attempts, possibly exceeding the configured maximum number of transmissions. A typical configured maximum number of transmissions could be, for example, one to four. The fact that extra retransmissions are permitted can be signaled to the Node B 23(5) using a specific field in the MAC-e header (e.g. a specific value or pattern for the retransmission sequence number [RSN], which indicates how many retransmissions are made for a particular packet), or the UE 21(5) can assume that the network can handle these extra retransmissions without dropping packets. The fact that extra retransmissions are permitted can be signaled to the Node B 23(5) in other ways besides in a MAC-e header, such as (for example) on a separate physical channel.

The UE MAC-e entity 61(5) maintains the queue level (e.g., level of queue 37(5)) below a (predetermined) limit by dropping incoming packets in such a way that no consecutive packets are lost. Differing strategies for dropping non-consecutive packets can be implemented, such as those previously described with reference to act 4-3 of FIG. 4.

Once the MAC-e entity 61(5) notices that a sufficient number of successful transmissions have occurred, it again starts to obey the outer loop power control and the configured limit on maximum number of transmissions, in like manner as discussed previously in conjunction with FIG. 2B. For example, the MAC-e entity 61(5) can exit the enhancement mode 60(5) of operation after a predetermined number of successful transmissions have occurred on the packet channel, the returning to the non-deterioration mode of operation comprising de-modifying the operational parameter for the packet channel and removing a requirement of dropping non-consecutive packets from the packet channel.

Figure 7:
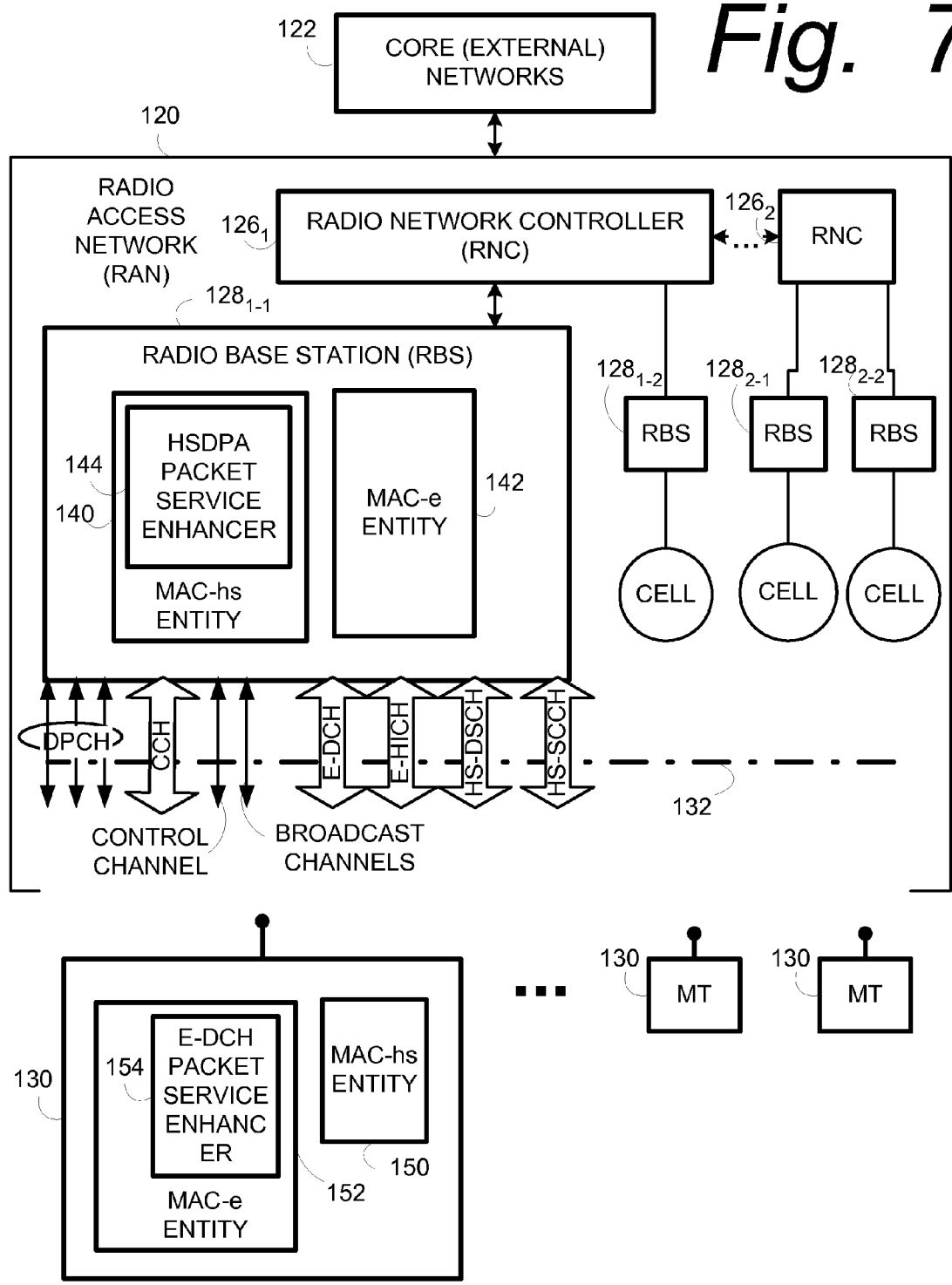
FIG. 7 is schematic view of example mobile communications system in which a packet service enhancer may be advantageously employed.

FIG. 7 illustrates an example, non-limiting telecommunications system wherein a radio access network 120 is connected to one or more external (e.g., core) networks 122. The external networks 122 may comprise, for example, connection-oriented networks such as the Public Switched Telephone Network (PSTN) and/or the Integrated Services Digital Network (ISDN), and/or connectionless external core network such as (for example) the Internet. One or more of the external networks have unillustrated serving nodes such as, e.g., a Mobile Switching Center (MSC) node and a Serving General Packet Radio Service (GPRS) Support node (SGSN) working in conjunction with a Gateway GRPS Support Node (GGSN).

Each of the core network service nodes connects to the radio access network (RAN) 120 over a suitable interface. In the particular, non-limiting example shown in FIG. 7, the radio access network (RAN) 120 is a UMTS Terrestrial Radio Access Network (UTRAN) and the interface with the external network is over the Iu interface. The radio access network (RAN) 120 includes one or more radio network controllers (RNCs) 126 and one or more radio base stations (RBS) 128. For sake of simplicity, the radio access network (RAN) 20 of FIG. 7 is shown with only two RNC nodes, particularly RNC $126_1$ and RNC $126_2$. Each RNC 126 is connected to one or more base stations (BS) 128 over an Iub interface. For example, and again for sake of simplicity, two base station nodes are shown connected to each RNC 126. In this regard, RNC $126_1$ serves base station $128_{1-1}$ and base station $128_{1-2}$, while RNC $126_2$ serves base station $128_{2-1}$ and base station $128_{2-2}$. It will be appreciated that a different number of base stations can be served by each RNC, and that RNCs need not serve the same number of base stations. Moreover, FIG. 7 shows that an RNC can be connected over an Iur interface to one or more other RNCs in the UTRAN 124. Further, those skilled in the art will also appreciate that a base station is sometimes also referred to in the art as a radio base station, a node B, or B-node, as has been done in conjunction with discussion of various previous embodiments. In the example of FIG. 7, a radio network control node is considered a "superior" node to a radio base station node.

It should be understood that at least one and likely more of the RNCs of the radio access network have an interface to one or more core networks. Further, in order to support continuation of established connections when the UE is moving between cells controlled by different RNCs in the Radio Access Network, a Signalling Network (e.g. Signalling System No 7) enables RNCs to perform the required RNC-RNC signalling.

In the illustrated embodiments, for sake of simplicity each base station 128 is shown as serving one cell. For base station $128_{1-2}$, for example, the cells are represented by a circle. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

As shown in FIG. 7, mobile terminals (MT) 130 communicates with one or more cells or one or more base stations (BS) 128 over a radio or air interface 132. In differing implementations, the mobile terminals (MT) 130 can be known by different names, such as wireless terminal, mobile station or MS, user equipment unit, handset, or remote unit, for example. Each mobile terminal (MT) may be any of myriad devices or appliances, such as mobile phones, mobile laptops, pagers, personal digital assistants or other comparable mobile devices, SIP phones, stationary computers and laptops equipped with a real-time application, such as Microsoft netmeeting, Push-to-talk client etc. Preferably, at least for a UTRAN implementation of the radio access network (RAN) 20, radio access is based upon Wideband, Code Division Multiple Access (WCDMA) with individual radio channels allocated using CDMA spreading codes. Of course, other access methods may be employed.

FIG. 7 further illustrates in simplified form that different types of channels may exist between one of the base stations 128 and mobile terminals (MT) 130 for transport of control and user data. For example, in the forward or downlink direction, there are several types of broadcast channels, one or more control channels, one or more common traffic channels (CCH), dedicated traffic channels (DPCH), and the high-speed downlink shared channel (HS-DSCH) which is herein of particular interest. The downlink dedicated physical channel (DPCH) carries both the Dedicated Physical Data Channel (DPDCH) and the Dedicated Physical Control Channel (DPCCH). The aforementioned E-DCH channel and E-HICH channel are also shown in FIG. 7. The high-speed downlink shared channel (HS-DSCH) and the high-speed shared control channel (HS-SCCH) are separate channels. As understood by those skilled in the art, the signaling carried by the high-speed shared control channel (HS-SCCH) is performed by transmitting the HS-SCCH TTI two slots in advance of the corresponding HS-DSCH TTI. The HS-SCCH contains information which is sent to the mobile terminals so that the mobile terminals know if they have data to receive on the HS-PDSCh channel or not.

The RNC 126 configures the cell to support HSDPA. Thereafter it is up to the Node-B 128 to allocate power and the amount of codes needed at respective TTI transmissions.

As shown in FIG. 7, the Node-Bs 128 includes a MAC-hs entity 140 for the HSDPA channel and a MAC-e entity 142 for the E-DCH channel, such as shose described in preceding embodiments. The MAC-hs entity 140 can include the aforementioned packet service enhancer, e.g., packet service enhancer 44(7). Similarly, the UEs 130 include a MAC-hs entity 150 for the HSDPA channel and a MAC-e entity 152 for the E-DCH channel, such as shose described in preceding embodiments. The MAC-e entity 152 can include the aforementioned packet service enhancer, e.g., packet service enhancer 54(7).

It will be appreciated that, in one or more of the aforementioned embodiment and other embodiments encompassed hereby, that the MAC-hs entities, the MAC-e entities, and/or the packet service enhancers may be implemented using individual hardware circuits, using software programs and data in conjunction with one or more suitably programmed digital microprocessors or general purpose computers, using application specific circuitry (ASIC), and/or using one or more digital signal processors (DSPs).

The technology described herein provides enhanced service (e.g., voice over IP application) quality by increasing the coverage and eliminating harmful consecutive packet losses.

Although various embodiments have been shown and described in detail, the claims are not limited to any particular embodiment or example. None of the above description should be read as implying that any particular element, act, range, or function is essential. The invention is not to be limited to the disclosed embodiment, but on the contrary, is intended to cover various modifications and equivalent arrangements.

What is claimed is:

1. A method of operating a transmitting entity communicating on a packet channel existing over an air interface, the method comprising:
    performing, at the transmitting entity, a monitoring of a radio link connection carried by the packet channel;
    detecting a deterioration of the radio link connection based on the monitoring; and
    in response to detecting the deterioration of the radio link connection:
        modifying an operational parameter for the packet channel; and,
        dropping non-consecutive packets from the packet channel so that dropped non-consecutive packets are not carried over the air interface wherein an application source rate at which packets are transmitted is compatible with an available physical channel rate of the high speed packet access channel.

2. The method of claim 1, wherein performing the monitoring comprises detecting deterioration of the radio link connection carried by the packet channel.

3. The method of claim 1, wherein the act of modifying the operational parameter for the packet channel is performed to prevent premature dropping of a packet due to a prevailing reordering timer timeout setting.

4. The method of claim 1, wherein the act of modifying the operational parameter for the packet channel comprises increasing an allowed transmission time for a frame carried by the packet channel.

5. The method of claim 4, wherein the packet channel is a HSDPA channel, wherein the transmitting entity is a base station node, and wherein increasing the allowed transmission time for a frame carried by the packet channel comprises increasing a delay threshold in a packet scheduler of the base station node.

6. The method of claim 1, wherein the act of modifying the operational parameter for the packet channel comprises modifying a delay requirement for packets of the radio link connection carried by the packet channel.

7. The method of claim 1, wherein the act of modifying the operational parameter for the packet channel comprises increasing total received energy of packets transmitted on the packet channel.

8. The method of claim 7, wherein the act of increasing total received energy of packets transmitted on the packet channel comprises increasing transmission power for the packet channel.

9. The method of claim 7, wherein the act of modifying the operational parameter comprises increasing an allowable number of retransmission attempts for packets on the packet channel.

10. The method of claim 9, wherein the transmitting entity is a user equipment unit (UE), and further comprising signaling a new allowable number of retransmission attempts in a field of a MAC-e header.

11. The method of claim 1, wherein the transmitting entity is a base station node, and wherein the packet channel is a High Speed Downlink Packet Access (HSDPA) channel.

12. The method of claim 1, wherein the transmitting entity is a user equipment unit (UE), and wherein the packet channel is an E-DCH channel.

13. The method of claim 1, wherein the act of detecting deterioration of a radio link connection with the user equipment unit comprises one of: (1) monitoring a number of transmission attempts for each packet; (2) counting a number of times a maximum number of transmissions attempts has been exceeded, (3) counting a number of abandoned packets, and (4) measuring actual power needed to transmit the packets on the packet channel.

14. The method of claim 1, wherein the act of dropping the non-consecutive packets from the packet channel comprises dropping non-consecutive packets according to a predetermined strategy.

15. The method of claim 14, wherein the predetermined strategy of dropping the non-consecutive packets from the packet channel comprises one of:
    (1) dropping packets according to a probability theory;
    (2) dropping packets based on packet size;
    (3) dropping packets based on packet content;
    (4) dropping every $n^{th}$ packet, wherein n is a positive integer greater than two.

16. The method of claim 1, wherein the act of dropping the non-consecutive packets from the packet channel comprises one of: (1) dropping packets already queued in a packet queue; (2) dropping incoming packets before entry into a packet queue; (3) a combination of (1) and (2).

17. The method of claim 1, further comprising exiting an enhancement mode of operation after a predetermined number of successful transmissions have occurred on the packet channel, the returning to the non-deterioration mode of operation comprising:
    de-modifying the operational parameter for the packet channel; and
    removing a requirement of dropping non-consecutive packets from the packet channel.

18. A base station node of a telecommunications system which transmits a downlink HSDPA packet channel existing over an air interface between the base station node and a user equipment unit, the base station node comprising:
    a detector configured to detect deterioration of a radio link connection carried by the packet channel; and
    a processor configured to:
        modify an operational parameter for the packet channel;
        drop non-consecutive packets from the packet channel so that dropped non-consecutive packets are not carried over the air interface wherein an application source rate at which packets are transmitted is compatible with an available physical channel rate of the high speed packet access channel.

19. A user equipment unit which transmits an uplink E-DCH packet channel existing over an air interface between the user equipment unit and a base station node of a telecommunications system, the user equipment unit comprising:
 a detector configured to detect deterioration of a radio link connection carried by the packet channel; and
 a processor configured to:
  modify an operational parameter for the packet channel;
  drop non-consecutive packets from the packet channel so that dropped non-consecutive packets are not carried over the air interface wherein an application source rate at which packets are transmitted is compatible with an available physical channel rate of the high speed packet access channel.

20. A base station node of a telecommunications system comprising:
 a transmitter configured to transmit packets over an air interface on a packet channel;
 a detector configured to detect deterioration of a radio link connection carried by the packet channel;
 a packet service enhancer configured to drop non-consecutive packets from the packet channel in response to detection of the deterioration wherein an application source rate at which packets are transmitted is compatible with an available physical channel rate of the high speed packet access channel.

21. The node of claim 20, wherein the packet service enhancer is configured to drop only non-consecutive packets from the packet channel upon detection of the deterioration.

22. The node of claim 20, wherein the packet service enhancer is configured to either:
 (1) drop packets according to a probability theory;
 (2) drop packets based on packet size;
 (3) drop packets based on packet content; or
 (4) drop every $n^{th}$ packet, wherein n is a positive integer greater than two.

23. The node of claim 20, further comprising a packet queue, and wherein the packet service enhancer is configured to either (1) drop packets already queued in a packet queue; (2) drop incoming packets before entry into a packet queue; (3) perform a combination of (1) and (2).

24. The node of claim 20, wherein the packet service enhancer is configured, prior to dropping the packets, to modify an operational parameter for the packet channel.

25. The node of claim 20, wherein the packet service enhancer is configured so that no consecutive packets are dropped.

* * * * *